No. 637,934. Patented Nov. 28, 1899.
C. W. IDEN.
CARBID CONTAINER FOR ACETYLENE GAS GENERATORS.
(Application filed June 12, 1899.)

(No Model.)

WITNESSES:

INVENTOR
Charles W. Iden.
BY
HIS ATTORNEY

UNITED STATES PATENT OFFICE.

CHARLES W. IDEN, OF NEW YORK, N. Y., ASSIGNOR TO THE ELECTRO LAMP COMPANY, OF SAME PLACE.

CARBID-CONTAINER FOR ACETYLENE-GAS GENERATORS.

SPECIFICATION forming part of Letters Patent No. 637,934, dated November 28, 1899.

Application filed June 12, 1899. Serial No. 720,162. (No model.)

*To all whom it may concern:*

Be it known that I, CHARLES W. IDEN, a citizen of the United States, residing in the borough of Manhattan, city and State of New York, have invented certain new and useful Improvements in Carbid-Containers, of which the following is a specification.

My invention relates to a container for carbid. I will describe a container embodying my invention and then point out the novel features thereof in the claims.

Figure 1:
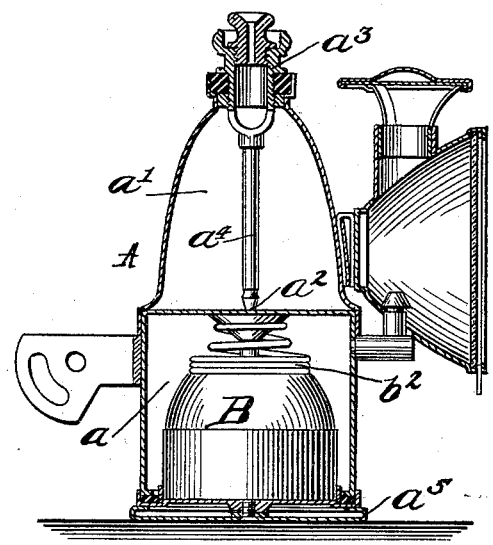
Figure 2:
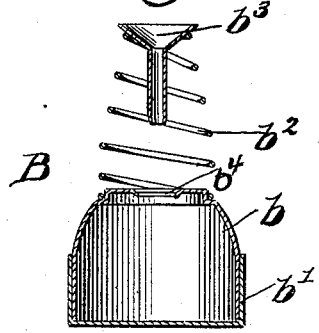

In the accompanying drawings, Figure 1 is a vertical sectional view of a bicycle-lamp, showing a container for carbid located therein embodying my invention. Fig. 2 is a vertical sectional view of the container shown in Fig. 1.

Similar letters of reference designate corresponding parts.

A represents a bicycle-lamp, and B a container for carbid. The container B is located in the lower chamber $a$ of the lamp, the upper chamber $a'$ of which is adapted to contain water. The supply of water to the container is regulated by means of a valve $a^2$, the adjustment of which is provided for by the nut $a^3$, to which the stem $a^4$ of the valve is connected.

The container B comprises two shells $b\ b'$, one of which is fitted within the other, as shown. The shell $b$ has connected to it one end of a spiral spring $b^2$, and to the other end of the spiral spring is connected a funnel $b^3$. When the spring is compressed, the delivery end of the funnel is adapted to project through an opening $b^4$ and within the shell $b$.

In practice the container B is inserted in the chamber $a$ through the opening closed by the removable bottom $a^5$. The funnel $b^3$ is held directly against the valve-opening (not shown) by the spiral spring, so that the water will be conducted directly to the carbid. The swelling of the carbid due to its being attacked by water is taken up by the spiral spring.

What I claim as my invention is—

1. A carbid-container comprising separate shells fitting one within the other, the upper shell being provided with an opening in its top and carrying a funnel the delivery end of which is over said opening and a spring by which said funnel is supported from said shell, substantially as described.

2. The combination with a carbid-container having an opening in its top, of a spiral spring secured thereto, and a funnel carried by said spring, the delivery end of which is over the said opening.

In testimony whereof I have signed my name to this specification in the presence of two subscribing witnesses.

CHARLES W. IDEN.

Witnesses:
 CHAS. MERTEN,
 EMIL CRUSINS.